US010445503B2

United States Patent
Basehore et al.

(10) Patent No.: US 10,445,503 B2
(45) Date of Patent: Oct. 15, 2019

(54) SECURE PERSISTENT SOFTWARE UPDATES

(71) Applicant: Google Inc., Mountain View, CA (US)

(72) Inventors: Derek Basehore, Mountain View, CA (US); Nick Sanders, Saratoga, CA (US)

(73) Assignee: Google LLC, Mountain View, CA (US)

( * ) Notice: Subject to any disclaimer, the term of this patent is extended or adjusted under 35 U.S.C. 154(b) by 272 days.

(21) Appl. No.: 15/650,492

(22) Filed: Jul. 14, 2017

(65) Prior Publication Data

US 2019/0018964 A1   Jan. 17, 2019

(51) Int. Cl.
*H04L 29/06* (2006.01)
*G06F 21/57* (2013.01)
*G06F 8/65* (2018.01)
*G06F 21/55* (2013.01)
*G06F 21/60* (2013.01)
*G06F 21/74* (2013.01)
*G06F 21/50* (2013.01)
*H04L 9/32* (2006.01)

(52) U.S. Cl.
CPC ............... *G06F 21/57* (2013.01); *G06F 8/65* (2013.01); *G06F 21/55* (2013.01); *G06F 21/606* (2013.01); *G06F 21/74* (2013.01); *G06F 21/50* (2013.01); *H04L 9/32* (2013.01)

(58) Field of Classification Search
CPC .......... G06F 21/50; G06F 21/55; G06F 21/57; G06F 21/74; G06F 21/606; G06F 8/65; H04L 9/32; H04L 63/08
See application file for complete search history.

(56) References Cited

U.S. PATENT DOCUMENTS

| 6,282,709 | B1 * | 8/2001 | Reha | G06F 8/65 |
| | | | | 717/175 |
| 6,513,159 | B1 * | 1/2003 | Dodson | G06F 9/4411 |
| | | | | 713/100 |
| 7,316,013 | B2 * | 1/2008 | Kawano | G06F 8/65 |
| | | | | 717/168 |
| 7,389,504 | B2 * | 6/2008 | Kawano | G06F 8/65 |
| | | | | 717/168 |
| 8,245,218 | B2 * | 8/2012 | Giambalvo | G06F 8/61 |
| | | | | 717/172 |

(Continued)

FOREIGN PATENT DOCUMENTS

| CN | 101310472 | 11/2008 |
| WO | 2013002495 | 1/2013 |

OTHER PUBLICATIONS

"International Search Report and Written Opinion", PCT Application No. PCT/US2018/040830, dated Oct. 4, 2018, 12 pages.

(Continued)

*Primary Examiner* — Hosuk Song
(74) *Attorney, Agent, or Firm* — Colby Nipper PLLC (57) ABSTRACT

Techniques and devices for secure persistent software updates are described. Through use of these techniques and devices, events that can prevent a software update from occurring can be detected and operations that enable the software update to occur can be performed. The techniques are capable of ensuring a computing device is using a latest software and that persistent software updates continue, despite any efforts to compromise the computing device.

20 Claims, 6 Drawing Sheets

(56) References Cited

U.S. PATENT DOCUMENTS

| | | | |
|---|---|---|---|
| 8,612,742 B2* | 12/2013 | Hirabayashi | G06F 21/51 |
| | | | 713/150 |
| 8,776,040 B2* | 7/2014 | Chalmers | G06F 8/654 |
| | | | 717/168 |
| 2010/0070800 A1 | 3/2010 | Hanna | |
| 2011/0010543 A1 | 1/2011 | Schmidt et al. | |
| 2012/0151223 A1 | 6/2012 | Conde et al. | |
| 2014/0068594 A1 | 3/2014 | Young et al. | |

OTHER PUBLICATIONS

"Windows Update and Automatic Reboots", Retrieved at: https://drive.google.com/file/d/0B3fILYxNc7TfRGQ4UV9HaGotMzA/view, Oct. 2, 2008, 18 pages.

* cited by examiner

SECURE PERSISTENT SOFTWARE UPDATES

BACKGROUND

Currently, a persistent attack can compromise a computing device and prevent the computing device from performing a software update. In general, the computing device performs a software update by retrieving a latest software from an update server, performing a reboot, and loading the latest software during a boot-up process. However, the persistent attack can prevent the computing device from communicating with the update server, rebooting after retrieving the latest software, or loading the latest software during the boot-up process. Due to the risk of a persistent attack, the computing device cannot be trusted to consistently perform a software update.

SUMMARY

This document describes techniques for, and systems that enable, secure persistent software updates. The techniques detect events that can prevent a software update from occurring and enable the software update to occur. In this way, the techniques are capable of ensuring a computing device has the latest software that can provide security against a persistent attack and decrease time that the computing device is compromised by the persistent attack.

This document also describes a secure watchdog capable of monitoring messages received from an update server, determining whether the computing device requires a software update, ensuring the computing device reboots after retrieving the latest software, ensuring the computing device loads the latest software during the a boot-up process, and enabling the computing device to perform a software update. This secure watchdog can be made compact and compatible with many common computing devices, such as a smart phone, a wireless router, and an automatic teller machine (ATM). In cases where security of the computing device is required, these secure watchdogs can be installed in, or connected to, the computing device and, by so doing, ensure persistent software updates continue, despite any efforts to compromise the computing device.

This summary is provided to introduce simplified concepts concerning secure persistent software updates, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and systems for secure persistent software updates are described with reference to the following drawings. The same numbers are used throughout the drawings to reference like features and components.

DETAILED DESCRIPTION

Overview

This document describes techniques using, and devices enabling, secure persistent software updates. The techniques detect events that can prevent a software update from occurring and enable the software update to occur. In this way, the techniques ensure a computing device is using the latest software and that the persistent software updates continue, despite any efforts to compromise the computing device. Furthermore, the techniques provide additional security by decreasing a time that the computing is compromised.

Consider, for example, a situation where a persistent attack prevents the computing device from communicating with the update server. As a result, the computing device may not know a latest software is available on the update server and may be unable to retrieve the latest software. Current techniques use a separate embedded computer dedicated to managing a network in order to ensure communication with the update server. However, this adds additional complexity and cost. Contrast this with the techniques, where a network is managed by the computing device and messages received from an update server are monitored. Responsive to detecting a lack of communication with the update server, operations occur to enable the computing device to perform the software update.

In another example situation, the persistent attack prevents the computing device from rebooting after the computing device retrieved the latest software from the update server. Consequently, the computing device continues executing a previous software and remains compromised by the persistent attack. The techniques described herein can detect this situation and cause the computing device to reboot.

In yet another example situation, the persistent attack prevents the latest software from loading during a boot-up process. Instead, the persistent attack may cause a previous software or an unsecure software to be loaded, which is unable to remove the persistent attack. In some cases, the previous software may be a valid software that can be loaded by a trusted boot-up process. Using the techniques, an additional step is added to the boot-up process to determine whether a software to be loaded corresponds with the latest software. If the software does not correspond with the latest software, the computing device is caused to operate in a recovery mode that enables the software update to occur.

The techniques can address each stage of the software update process to ensure the persistent software update occurs, even if the computing device is compromised. This document now turns to an example environment, after which example methods and an example computing system are described.

Example Environment

Figure 1:
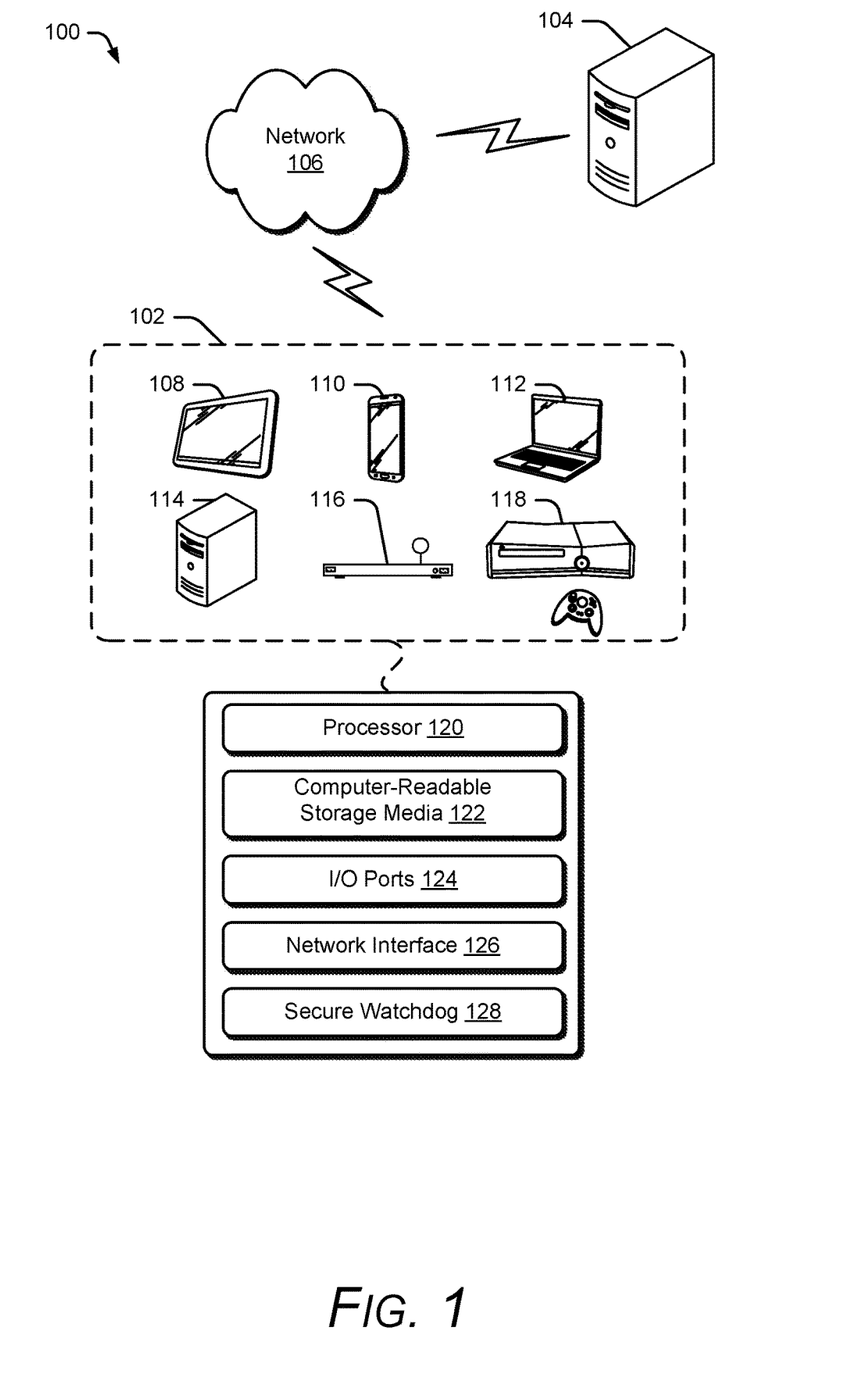
FIG. 1 illustrates an example environment in which secure persistent software updates can be implemented.

FIG. 1 is an illustration of an example environment 100 in which techniques enabling secure persistent software updates can be performed. Environment 100 includes a computing device 102 configured to retrieve a latest software from an update server 104 through a network 106. The computing device 102 can be embodied as a tablet 108, a mobile device 110, a laptop 112, a server 114, a wireless router 116, or a video game system 118. Although not shown, other embodiments of the computing device 102 are also contemplated such as an automated teller machine (ATM) and a network switch. The network 106 is managed by the computing device 102. In some aspects, the network is an untrusted network.

The update server 104 is configured to send a message to the computing device 102 regarding a latest software available via the update server 104. The message can include information uniquely identifying the latest software, such as a time stamp for when the latest software became available on the update server 104 and/or a latest software version number associated with the latest software. Additionally, the message can include the latest software to enable the computing device 102 to retrieve the latest software. The message can also be signed by the update server 104 using a cryptographic key to enable the computing device 102 to verify the message was sent by the update server 104.

The update server 104 can send the message periodically, non-periodically, or according to a timing schedule (e.g., every hour on the hour, every half-hour during normal business hours). Additionally or alternatively, the update server 104 can send the message in response to receiving a request for the message, as described in further detail below.

The computing device 102 includes a processor 120 configured to execute current software stored via computer-readable storage media 122. The processor 120 can have any suitable number and/or type of processing cores, which may be configured in any suitable manner (e.g., a heterogeneous multi-core processor). The computer-readable storage media 122 includes volatile memory and non-volatile memory. Additionally, the computer-readable storage media 122 may include any suitable type, combination, or number of internal and/or external memories, including random-access memory (RAM) and read-only memory (ROM). Each memory of the computer-readable storage media 122 may be implemented as an on-chip memory area of hardware or an off-chip memory device that communicates data with processor 120 via a data interface or bus. Note that the computer-readable storage media 122 is implemented at least partially in hardware or physical devices that are configured to store data (e.g., digital or analog values) and do not include transitory signals or carrier waves. The current software stored via the computer-readable storage media 122 can include operating system software, recovery software, and/or application software. The current software can be configured for a mode of operation of the computing device 102, as described in further detail below. In general, the current software is software from a previous software update that a boot-up process is configured to load and the processor 120 is configured to execute.

The computing device 102 may also include input/output (I/O) ports 124. The I/O ports 124 allow computing device 102 to interact with other devices and users. The I/O ports 124 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with the I/O ports 124, such as human-input devices (HIDs), external memories, or other peripherals. The I/O ports 124 are used to confirm presence of a user in order to disable secure persistent software updates, as described in further detail below.

Network interface 126 provides connectivity to one or more networks and other devices connected therewith, such as the network 106, the update server 104, and the processor 120. Data communicated over the network interface 126 may be packetized or framed depending on a communication protocol or standard by which computing device 102 is communicating. The network interface 126 may include wired interfaces, such as Ethernet or fiber optic interfaces for communication over a local network, intranet, or the Internet. The network interface 126 may also include wireless interfaces that facilitate communication over wireless networks, such as wireless LANs, cellular networks, or wireless personal-area-networks (e.g., Bluetooth™).

The computing device 102 has multiple modes of operation that characterize hardware of the computing device 102 that is enabled and/or the current software that is executed by the computing device 102. The multiple modes of operation can include a normal mode that, in general, enables the computing device 102 to operate normally and perform a majority of functions available via hardware, the operating system software, and the application software. In some cases, the functionally available during the normal mode can lead the computing device 102 to become compromised. During the normal mode, the techniques for detecting events that prevent a software update can be employed.

The multiple modes can also include a recovery mode (e.g., diagnostic mode, safe mode) that, in general, enables the computing device 102 to perform a set of functions for diagnosing and fixing problems, including performing a software update. During the recovery mode, the functions available during the normal mode may be limited or reduced. For example, non-essential components (e.g., speakers, printers), non-essential software applications, and non-essential interfaces can be disabled. Furthermore, the recovery mode can restrict communication over the network 106, such as by only enabling communication with the update server 104. In some cases, software stored in the computer-readable storage media 122 that is configured for the recovery mode can be loaded and executed, such as recovery software. The software executed during the recovery mode can be read-only software to enhance security. To enable the software update, the recovery mode enables the computing device 102 to communicate with the update server 104 over the network, retrieve the latest software from the update server 104, store the latest software in the computer-readable storage media 122, and load the latest software during the boot-up process. In some aspects, the software update can be performed by the processor 120 during the recovery mode based on a user input or via an automatic software update routine.

A secure watchdog 128 is configured to implement secure persistent software updates on the computing device 102. The secure watchdog 128 includes an interface to the computing device 102 that can enable the secure watchdog 128 to communicate with the processor 120, access the computer-readable storage media 122, receive inputs from the I/O ports 124, and control a boot-up process of the computing device 102. Through the interface, the secure watchdog 128 can communicate with the update server (e.g., send and receive messages) via the processor 120. The secure watchdog 128 can be configured to provide information to or additional features for a Trusted Platform Module (TPM) on the computing device 102. The secure watchdog 128 can be internal or external to the computing device 102. In some aspects, the secure watchdog 128 can be configured to manage multiple computing devices.

The secure watchdog 128 can include a processor, memory, a timer, I/O ports, and busses. The memory can include non-volatile memory, such as flash memory, in order to store the information persistently when the secure watchdog 128 is powered-down. The timer is configured to determine an expiration of a time frame. The timer can be implemented via hardware or software. In some aspects, the timer is a watchdog timer configured to perform operations that enable the secure persistent software updates to occur in response to the time frame expiring, as described in further detail below. Components of the secure watchdog 128 can be packaged together on a single integrated circuit or packaged individually on separate integrated circuits. In some aspects, the secure watchdog 128 is implemented via a microcontroller.

The secure watchdog 128 is configured to be secure from the processor 120. In this way, the processor 120 cannot control the secure watchdog 128, write to the memory of the secure watchdog 128, or reset the timer of the secure watchdog 128. As a result, if the computing device 102 is compromised, the persistent attack cannot prevent the secure watchdog 128 from enabling secure persistent software updates on the computing device 102.

The secure watchdog 128 can securely store information that enables the secure persistent software updates. For example, the secure watchdog 128 can store the message received from the update server and information regarding a time the message was received. The secure watchdog 128 can also store information to enable the secure watchdog 128 to determine a time frame for receiving the message, such as time stamps from previously received messages or a known timing schedule of the update server. The secure watchdog 128 can also store the cryptographic key for authenticating the message as having been sent from the update server 104.

Additionally, the secure watchdog 128 can store unique identifiers associated with the current software, which the computing device 102 stores and executes (e.g., a current software version number, a time stamp the current software was available on the update server). The secure watchdog 128 can also store information regarding a previous software update (e.g., time stamp when the previous software update occurred, the message received from the update server associated with the previous software update, a flag indicating whether a reboot occurred since the previous software was retrieved from the update server). A minimum software version number can be stored to enable the secure watchdog 128 to prevent software having a version number below the minimum software version number from being loaded during the boot-up process. Furthermore, the secure watchdog 128 can store the automatic software update routine that enables the computing device 102 to perform the software update.

The secure watchdog 128 is further configured to ensure the persistent software update occurs on the computing device 102 by causing the computing device 102 to perform the software update or remaining operations that complete the software update. For example, the secure watchdog 128 can cause the computing device 102 to switch from operating according to the normal mode to the recovery mode and/or cause the computing device 102 to reboot. These operations can be caused by the secure watchdog 128 sending a hardware-generated signal to a general purpose input/output (GPIO) pin of the processor 120. The hardware-generated signal can be sent by the timer of the secure watchdog 128 in response to the time frame expiring. Alternatively, the hardware-generated signal can be activated by the processor of the secure watchdog 128 in response to receiving an indication from the timer that the time frame expired, or based on a determination of whether or not the software update is required. By using hardware-generated signals, the secure watchdog 128 can control the processor 120, even when the computing device 102 is compromised by a persistent attack.

During the recovery mode, the secure watchdog 128 can cause the processor 120 to execute the automatic software update routine by sending another hardware-generated signal or an interrupt to the processor 120. In some aspects, the secure watchdog 128 can copy the automatic software update routine to the computer-readable storage media 122 to enable the processor 120 to execute the automatic software update routine. As another example, the secure watchdog 128 can retrieve the latest software via the network interface 126, store the software in the computer-readable storage media 122, and cause the processor 120 to reboot.

Occasionally, the secure watchdog 128 and the techniques for enabling secure persistent software updates may be disabled for situations when the network 106 is unavailable or when the update server 104 is unavailable. In some aspects, the secure watchdog 128 can receive an input to terminate the secure persistent software updates through the I/O ports 124 or through the I/O ports of the secure watchdog 128. The input can be further configured to verify user presence. For example, a user can verify presence by pressing a physical button or by performing a sequence of actions that the secure watchdog 128 can detect. The secure watchdog 128 can also be configured to receive a termination message from the update server 104. The termination message can indicate that the update server 104 is no longer available, enabling the secure watchdog 128 to disable the secure persistent software updates. By disabling the secure persistent software updates, the secure watchdog 128 ceases to cause the computing device 102 to switch to the recovery mode and/or reboot.

Example Methods

FIGS. 2-5 depict example methods that enable secure persistent software updates. These methods are shown as sets of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to environment 100 of FIG. 1 and entities detailed in FIG. 1 and FIG. 6, reference to which is made for example only. The techniques are not limited to performance by one entity or multiple entities operating on one device.

Figure 2:
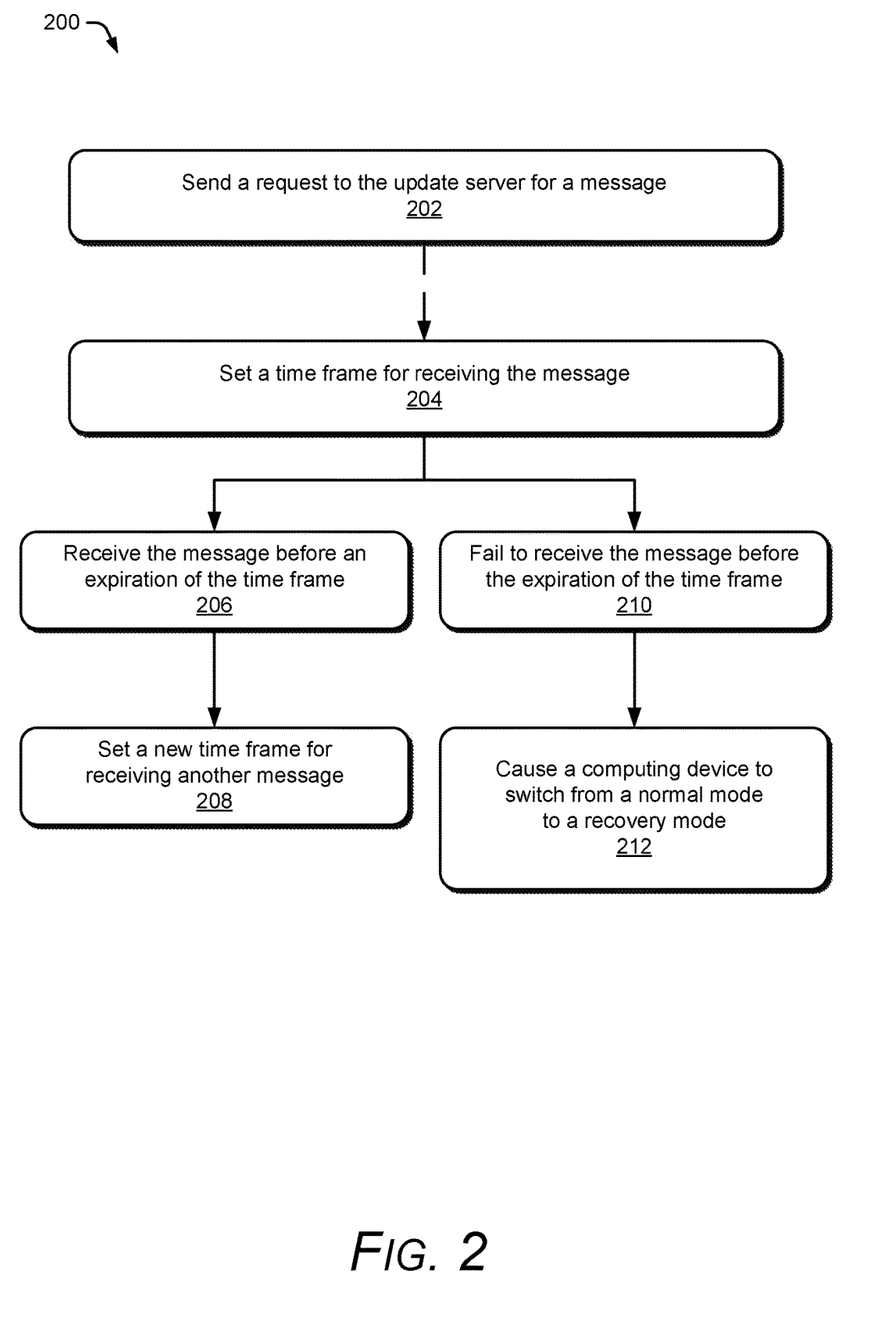
FIG. 2 illustrates an example method enabling secure persistent software updates by monitoring messages sent from the update server in FIG. 1.

FIG. 2 illustrates an example method 200 for enabling secure persistent software updates by monitoring messages received by the computing device 102 from the update server 104. Assume that the computing device 102 completed a boot-up process and the processor 120 is operating according to the normal mode, which enables the computing device 102 to receive messages from the update server and perform other operations.

Optionally, at 202, a request is sent to the update server for a message. For example, the request can be forwarded by the processor 120 from the secure watchdog 128 to the update server 104 through the network interface 126. In some situations, the secure watchdog 128 causes the processor 120 to send the request responsive to detecting a completion of the boot-up process or based on an indication that the computing device 102 is compromised. The request is configured to cause the update server 104 to send the message to the computing device 102.

At 204, a time frame is set for receiving the message from the update server. The time frame can be on the order of minutes to hours (e.g., five minutes, thirty minutes, one hour, two hours). The time frame can be pre-determined or determined based on a known or estimated time frame for the update server 104 to send the message. The time frame can also be based on the time the request was sent at 202 and include a tolerance to account for delays. The secure watchdog 128 can configure (e.g., program) the timer for the time frame and initiate (e.g., start) the timer. During the time frame, the computing device 102 can continue operating in the normal mode.

At 206, the message is received before an expiration of the time frame. The message can be received by the processor 120 and forwarded to the secure watchdog 128. The secure watchdog 128 can be further configured to authenticate the message as having been sent from the update server 104 based on the digital signature provided in the message.

Responsive to receiving the message within the time frame, at 208, a new time frame is set for receiving another message. The new time frame can be shorter than, longer than, or equal to the previous time frame. In some aspects, the new time frame is set according to a known or estimated scheduling time of the update server 104. For example, the secure watchdog 128 can determine a remaining time until the update server 104 is configured to send a next message and set the new time frame based on the remaining time. In other aspects, the secure watchdog 128 resets a watchdog timer to prevent the watchdog timer from timing out. The process can then return to step 206 or step 210 for receiving the other message before an expiration of the new time frame.

Alternatively, at 210, the message fails to be received before the expiration of the time frame. The message can fail to be received because a request to send the message was not received by the update server 104, the message was received by the processor 120 but not forwarded to the secure watchdog 128, or the message was not received by the processor 120 or the secure watchdog 128. Also, the message may be received but the message is not determined to be a valid message by the secure watchdog 128 (e.g., the digital signature of the message does not correspond to the update server 104).

Responsive to failing to receive the message within the time frame, at 212, a computing device is caused to switch from operating according to a normal mode to a recovery mode that enables a software update to occur on the device. For example, the secure watchdog 128 can send a hardware-generated signal to cause the processor 120 to switch to the recovery mode.

Through the techniques described above, the secure watchdog 128 can continually monitor messages received from the update server 104. In this way, the secure watchdog 128 can detect a communication failure with the update server 104, which indicates a software update cannot occur and that the computing device 102 may be compromised. By switching to the recovery mode responsive to failing to receive the message, the functionality of the computing device 102 is limited and the software update can be performed, both of which can reduce a vulnerability of the computing device 102 to a persistent attack. Furthermore, by using a time frame, the secure watchdog 128 ensures operations to perform the secure persistent software updates occur and reduces a duration that the computing device 102 is potentially compromised.

Figure 3:
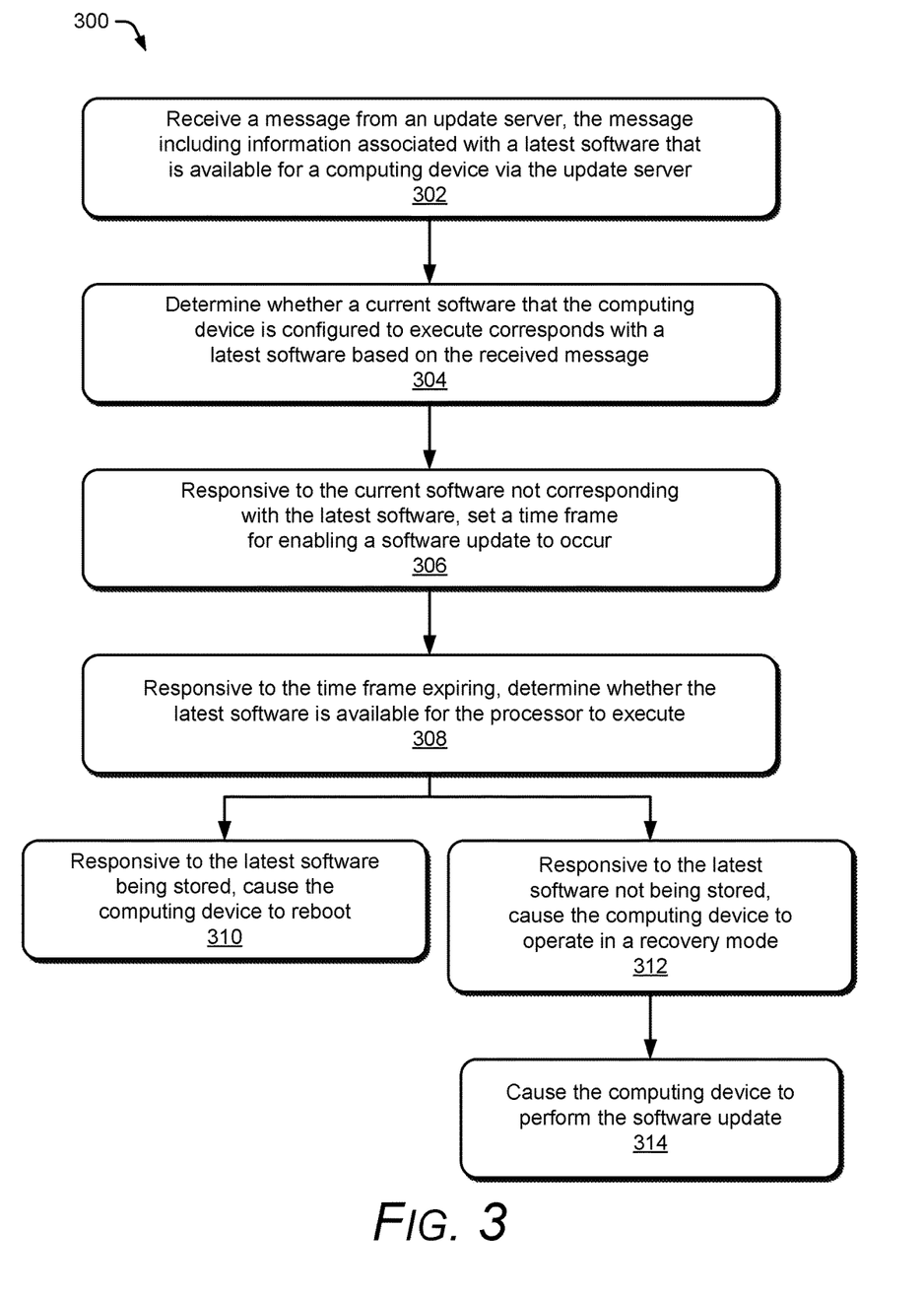
FIG. 3 illustrates another example method enabling secure persistent software by determining whether the computing device is configured to use the latest software.

FIG. 3 illustrates an example method 300 for enabling secure persistent software by determining whether the current software the computing device 102 is configured to use corresponds with the latest software available via the update server 104. At 302, a message is received from an update server, similar to 206 in FIG. 2. The message includes information associated with a latest software that is available for a computing device 102 via the update server 104, such as a latest software version number.

At 304, a current software that the computing device is configured to execute is determined to correspond or not correspond with the latest software based on the received message. The current software can include the operating system software and/or the application software stored in the computer-readable storage media 122 of the computing device 102. As an example, the secure watchdog 128 can determine whether the current software corresponds with the latest software by comparing the current software version number to the latest software version number. The secure watchdog 128 can access the computer-readable storage media 122 to retrieve information associated with the current software, request the information from the processor 120, or use the information that is stored in the memory of the secure watchdog 128, such as from a previous software update.

At 306, responsive to the current software not corresponding with the latest software, a time frame is set for enabling a software update to occur on the computing device (similar to 204 in FIG. 2). The time frame can be on the order of minutes to hours (e.g., five minutes, thirty minutes, one hour, two hours). Alternatively, responsive to the current software corresponding with the latest software, the operations can proceed to 208 in FIG. 2 and set a new time for receiving another message.

At 308, responsive to the time frame expiring, the latest software is determined to be stored or not stored on the computing device. The secure watchdog 128 can determine if the latest software is available based on information stored via the secure watchdog 128 (e.g., information from a previous software update and/or information indicating whether a reboot occurred after loading a previous software) or based on information stored in the computer-readable storage media 122. Alternatively, the secure watchdog 128 can determine whether information associated with a software stored in the computer-readable storage media 122 corresponds with information associated with the latest software.

At 310, responsive to the latest software being stored, the computing device is caused to reboot when the time frame expires. For example, the secure watchdog 128 can send a hardware-generated signal to cause the processor 120 to reboot. The reboot initiates a boot-up process, which enables the computing device 102 to load the latest software from the computer readable storage media 122 and execute the latest software.

Alternatively, at 312, responsive to the latest software not being stored, the computing device is caused to operate in a recovery mode, similar to 212 in FIG. 2.

At 314, the computing device can be caused to perform the software update. For example, the secure watchdog 128 can send a hardware-generated signal or an interrupt to the processor 120 and enable the processor 120 to execute the automatic software update routine.

Through the techniques described above, the secure watchdog 128 can ensure the computing device 102 is executing the latest software that can provide security and protection from the persistent attack. By determining whether the current software corresponds with a latest software, the secure watchdog 128 can determine if a software update is required. By setting a time frame, the secure watchdog 128 provides the computing device 102 a window of time to perform some or all of the operations of the software update (such as retrieving the latest software from the update server and/or rebooting). When the time frame expires, the secure watchdog 128 takes appropriate action to enable or complete the software update. In particular, the techniques described above enable secure persistent software updates to occur when the computing device 102 is compromised and prevented from retrieving the latest software or rebooting after retrieving the latest software.

Figure 4:
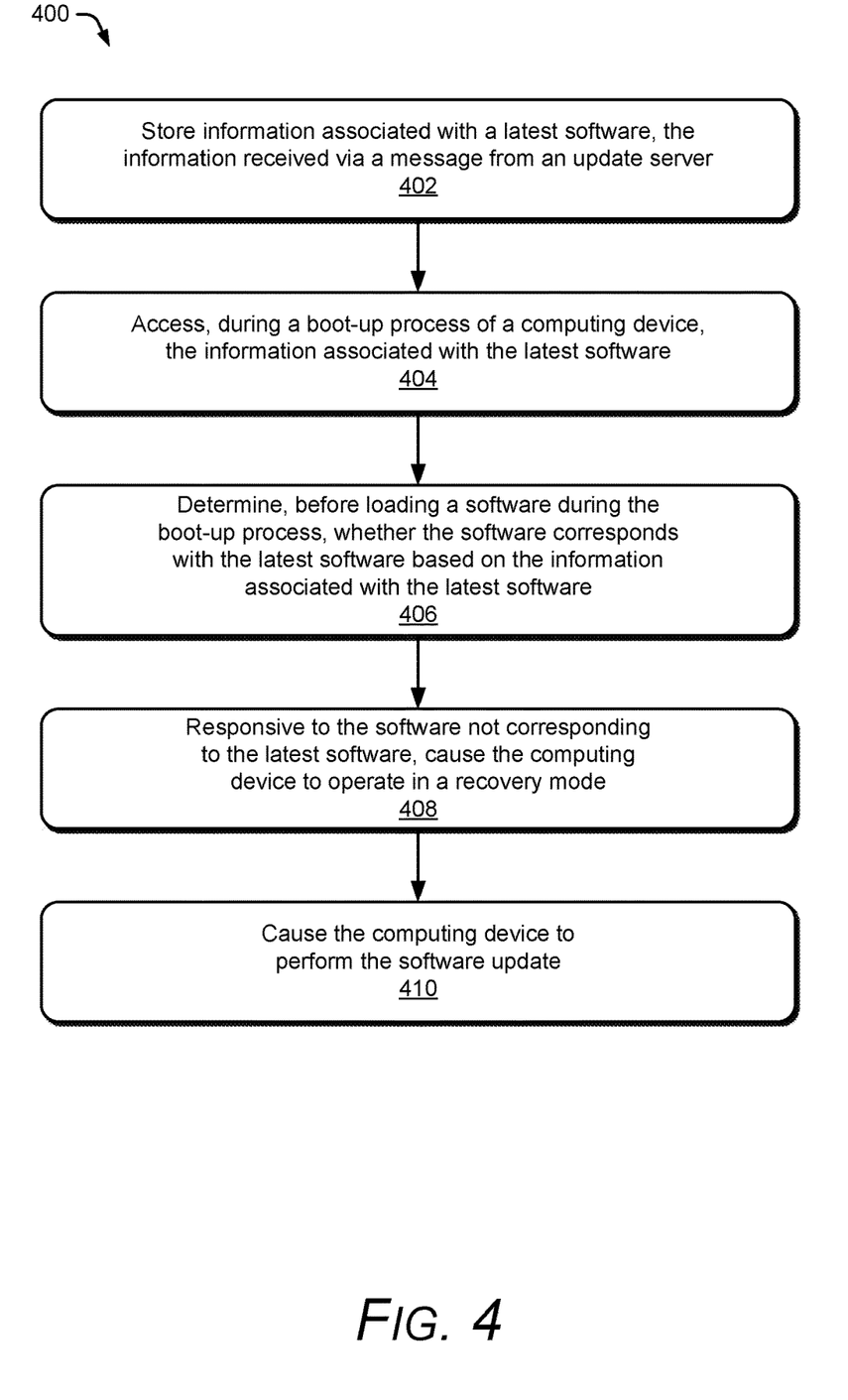
FIG. 4 illustrates yet another example method enabling secure persistent software updates by determining whether a software corresponds with a latest software before loading the software during a boot-up process.

FIG. 4 illustrates an example method 400 for enabling secure persistent software updates by determining whether a software corresponds with a latest software before loading the software during a boot-up process. At 402, information associated with a latest software is stored, such as a latest software version number. For example, the information is stored in a memory of the secure watchdog 128. The information is received via a message from the update server 104.

At 404, during a boot-up process of a computing device, the information associated with the latest software is accessed. For example, the secure watchdog 128 can access the information associated with the latest software that is stored in the memory of the secure watchdog 128. In some aspects, the boot-up process is a trusted boot-up process that performs other actions, such as verifying software signatures.

At 406, before loading a software during the boot-up process, the software is determined to correspond or not correspond with the latest software based on the information associated with the latest software. For example, the secure watchdog 128 can compare the latest software version number to a version number of the software.

At 408, responsive to the software not corresponding to the latest software, the computing device is caused to operate in a recovery mode that enables the software update to occur. For example, the secure watchdog 128 can cause the boot-up process to load recovery software by sending a hardware-generated signal to the processor 120. In this way, the secure watchdog 128 enables the computing device to not load the software.

While in the recovery mode, at 410, the computing device can be caused to perform the software update, similar to 314 in FIG. 3. For example, the secure watchdog 128 can enable the computing device 102 to automatically execute a software update routine.

Through the techniques described above, the secure watchdog 128 can be incorporated as part of the boot-up process and can ensure the computing device 102 loads the latest software during the boot-up process. By storing the information associated with the latest software and determining whether the software to be loaded corresponds with the latest software version number, the secure watchdog 128 can verify the latest software is loaded and prevent software that may be contaminated and/or vulnerable to a persistent attack from loading. Furthermore, the secure watchdog 128 can influence the boot-up process to load recovery software and cause the processor to operate according to a recovery mode, further protecting the computing device 102 from being influenced by the persistent attack.

Through the techniques described above, the secure watchdog 128 can also be configured to ensure an older software is not loaded during the boot-up process. As described above, a minimum software version number can be used by the secure watchdog 128 to determine whether a version number of the software to be loaded is older than the minimum software version number. The secure watchdog 128 can cause the computing device to operating in the recovery mode responsive to the software having a version number older than the minimum software version number. In this way, the secure watchdog 128 provide additional security to ensure a persistent attack is unable to roll-back software.

Figure 5:
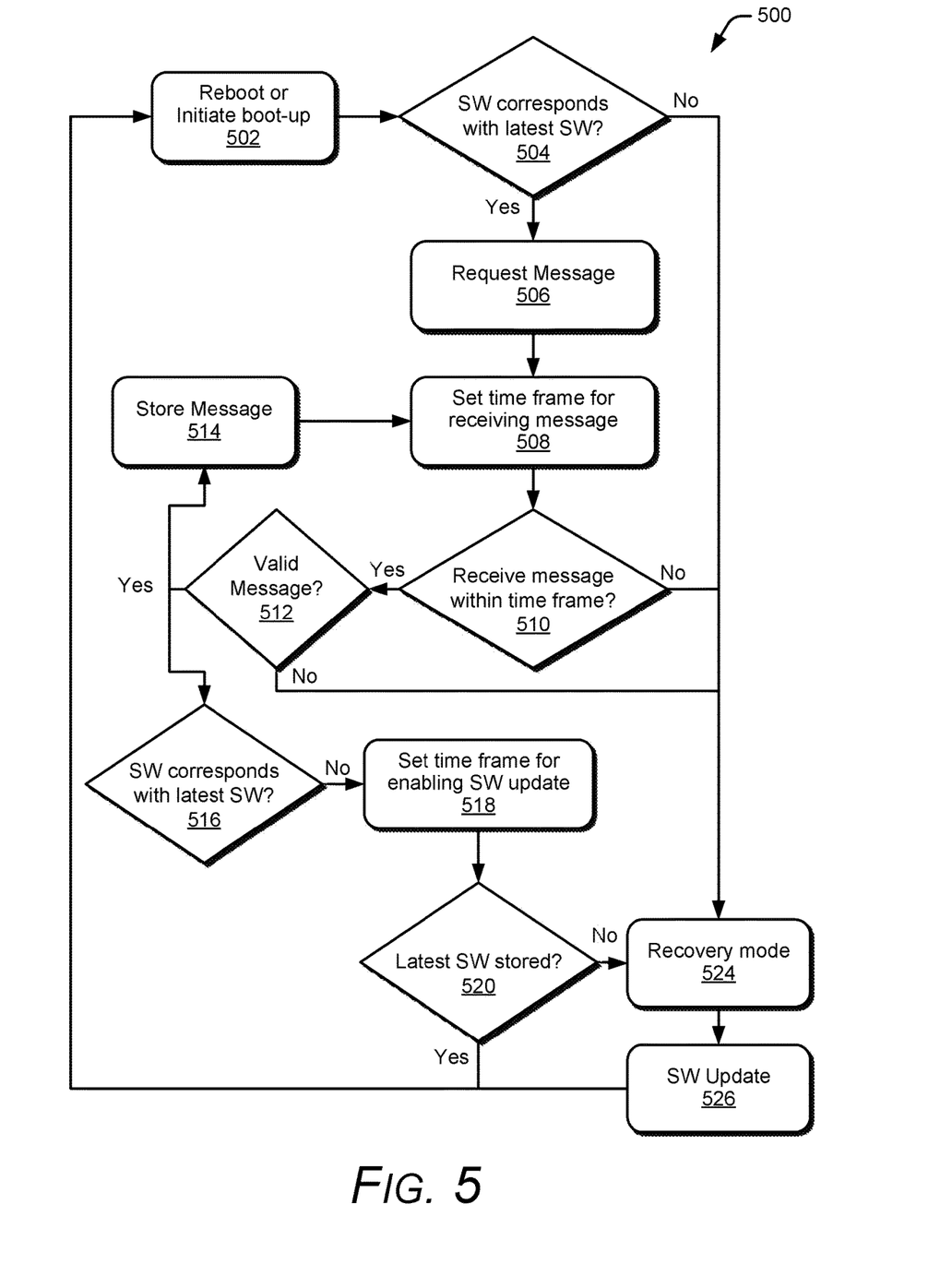
FIG. 5 illustrates an example flow diagram enabling secure persistent software updates incorporating methods from FIGS. 2-4.

FIG. 5 illustrates an example flow diagram, incorporating methods 200, 300, and 400 from FIG. 2-4. At 502, a boot-up procedure is initiated, such as when the computing device 102 is turned on, rebooted as part of causing a software update (e.g., after 314 or 410 in FIGS. 3 and 4), or when the processor is caused to be rebooted by the secure watchdog (e.g., at 310 in FIG. 3). At 504, a determination is made as to whether a software corresponds with a latest software before loading the current software as part of the boot-up process (e.g., at 406 in FIG. 4). Responsive to the software corresponding with the latest software, the software is loaded as part of the boot-up process.

At 506, a request can be sent for a message (e.g., 202 in FIG. 2) and at 508, a time frame is set for receiving the message (e.g., 204 and 208 in FIG. 2). Next, at 510, a determination is made as to whether the message is received within the time frame. If the message is received, at 512, a determination can be made as to whether the message is valid. For example, the secure watchdog 128 can determine if a digital signature of the message corresponds with a known digital signature of the update server 104. If the message is valid, at 514, the message is stored (e.g., 402 in FIG. 4) and the process returns to 508 (e.g., 208 in FIG. 2).

In addition to storing the message at 514, at 516, a determination can be made to determine whether the current software the computing device is configured to execute corresponds with a latest software available via the update server 104 (e.g., 304 in FIG. 3). In some aspects, the latest software may be different than the latest software in step 504, such as when the update server 104 has a new software update available. Responsive to the current software not corresponding to the latest software, at 518, a time frame is set for enabling a software update (e.g., 306 in FIG. 3). The time frame in step 518 can be different than the time frame for step 508. In some aspects, the time frame in step 518 can be smaller than the time frame for step 508 to enable the software update before another message is received. Responsive to an expiration of the time frame, the latest software is determined to be stored or not stored on the computing device 102 (e.g., 308 in FIG. 3). If the latest software is stored, the secure watchdog 128 can cause the computing device 102 to reboot and return to operations at 502.

Alternatively, if the message is not received within the time period at 510, the message is not determined to be valid at 512, or the latest software is determined to not be stored at 520, the process can continue at 524, whereby the computing device 102 is caused to operate in a recovery mode (e.g., 212, 312, and 408 in FIGS. 2-4). Next, at 526, the computing device 102 can be caused to perform the software update (e.g., 314 and 410 in FIGS. 3 and 4).

As illustrated in FIG. 5, a variety of combinations of methods 200, 300, and 400 can be used to enable secure persistent software updates. These techniques address each stage of the software update process thereby ensuring the persistent software update occurs.

Example Computing System

Figure 6:
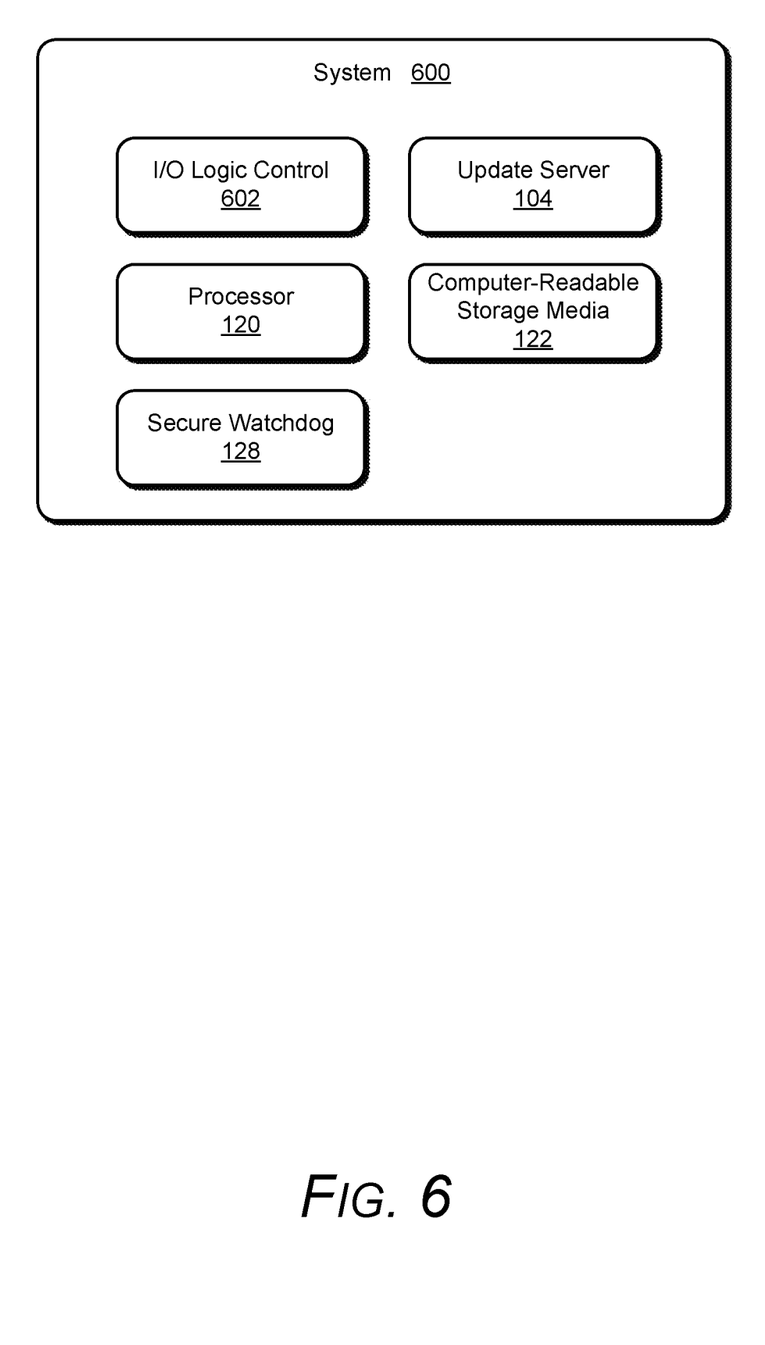
FIG. 6 illustrates an example computing system embodying, or in which techniques may be implemented that enable secure persistent software updates.

FIG. 6 illustrates various components of an example system 600 as described with reference to FIG. 1 to implement secure persistent software updates. Example system 600 can be integrated with electronic circuitry, communication interfaces and components, other hardware, firmware, and/or software needed to run the computing system. Example system 600 can also include other various communication interfaces and components, wireless LAN (WLAN) or wireless PAN (WPAN) components, other hardware, firmware, and/or software.

Example computing system 600 includes various components such as an input-output (I/O) logic control 602 (e.g., to include electronic circuitry). Computing system 600 also include any system components, engines, or managers to implement secure persistent software updates. In this example, system 600 includes update server 104, processor 120, computer-readable storage media 122, and secure watchdog 128.

CONCLUSION

Although embodiments of techniques using, and apparatuses enabling, secure persistent software updates have been described in language specific to features and/or methods, it is to be understood that the subject of the appended claims is not necessarily limited to the specific features or methods described. Rather, the specific features and methods are disclosed as example implementations enabling secure persistent software updates.

What is claimed is:

1. A device comprising:
a network interface configured to receive a message from an update server over a network;
a processor configured to:
operate the device according to a normal mode that enables the device to receive the message from the update server; and
a secure watchdog configured to:
set a time frame for receiving the message from the update server; and
responsive to not receiving the message before the expiration of the time frame, cause the processor to switch from operating the device according to the normal mode to operating the device according to a recovery mode, the recovery mode: having a reduced set of functions compared to the normal mode; and enabling a software update to occur on the device.

2. The device of claim 1, wherein responsive to receiving the message before an expiration of the time frame, the secure watchdog is further configured to set a new time frame for receiving another message from the update server over the network.

3. The device of claim 2, wherein the secure watchdog is further configured to determine the new time frame based on a schedule of the update server.

4. The device of claim 2, wherein receiving the message further includes authenticating the message as having been sent from the update server based on a digital signature of the message.

5. The device of claim 1, wherein the secure watchdog is a microcontroller embedded in the device.

6. The device of claim 1, wherein causing the processor to switch to the recovery mode is based on a hardware-generated signal sent from the secure watchdog to the processor.

7. The device of claim 6, wherein:
the secure watchdog includes a watchdog timer configured to send the hardware-generated signal based on the expiration of the time frame; and
the secure watchdog is further configured to reset the watchdog timer when the message is received.

8. The device of claim 1, wherein the secure watchdog is further configured to send, via the network interface, a request to the update server that causes the update server to send the message.

9. The device of claim 1, wherein the secure watchdog is further configured to:
receive a termination message; and
cease causing the processor to switch to the recovery mode.

10. The device of claim 9, wherein the termination message is received from the update server.

11. The device of claim 9, wherein the termination message includes an input from a user that verifies presence of the user.

12. A method comprising:
receiving a message from an update server, the message including information associated with a latest software that is available for a computing device via the update server;
determining, based on the received message, whether a current software that the computing device is configured to execute corresponds with the latest software;
responsive to the current software not corresponding with the latest software, setting a time frame for enabling a software update to occur on the computing device;
responsive to the time frame expiring, determining whether the latest software is stored on the computing device; and
responsive to the latest software being stored, causing the computing device to reboot, the reboot enabling the computing device to load the latest software; or
responsive to the latest software not being stored, causing the computing device to switch from operating according to a normal mode to operating according to a recovery mode that enables the software update to occur on the computing device, the recovery mode having a reduced set of functions compared to the normal mode.

13. The method of claim 12, wherein the determining whether the current software corresponds with the latest software is based on a comparison of a version number associated with the current software with a version number associated with the latest software.

14. The method of claim 12, wherein determining whether the latest software is stored on the device is based on information associated with a previous software update.

15. The method of claim 12, further comprising causing the computing device to perform the software update while the computing device is in the recovery mode.

16. A method comprising:
storing information associated with a latest software that is available via an update server, the information received via a message from the update server;
accessing, during a boot-up process of a computing device, the information associated with the latest software;
determining, before a software is loaded during the boot-up process, whether the software corresponds with the latest software based on the information associated with the latest software; and responsive to the software not corresponding to the latest software, causing the computing device to operate in a recovery mode, the recovery mode: enabling the computing device to not load the software; and enabling a software update to occur on the computing device.

17. The method of claim 16, wherein causing the computing device to operate in the recovery mode includes causing the boot-up process to load recovery software configured for the recovery mode.

18. The method of claim 17, wherein the recovery software is a read-only software stored on the computing device.

19. The method of claim 16, further comprising causing the computing device to perform the software update after causing the computing device to operate in the recovery mode.

20. The method of claim 16, wherein the information associated with the latest software is stored in a secure memory separate from the software.

* * * * *